United States Patent [19]

Thompson

[11] 4,401,288
[45] Aug. 30, 1983

[54] ADJUSTABLE OPTICAL MIRROR MOUNT

[75] Inventor: Corey M. Thompson, Medway, Mass.

[73] Assignee: Data General Corporation, Westboro, Mass.

[21] Appl. No.: 243,614

[22] Filed: Mar. 13, 1981

[51] Int. Cl.³ ............................................. A47G 1/24
[52] U.S. Cl. ..................................... 248/476; 248/274
[58] Field of Search ............... 248/466, 476, 483, 485, 248/487, 479, 179, 278, 183, 184, 185, 274

[56] References Cited

U.S. PATENT DOCUMENTS

| | | | |
|---|---|---|---|
| 903,137 | 11/1908 | Hubbard | 269/74 X |
| 2,278,250 | 3/1942 | Diesbach | 248/183 |
| 3,428,915 | 2/1969 | Leone | 248/487 X |
| 3,596,863 | 8/1971 | Kaspareck | 248/487 X |

Primary Examiner—James T. McCall
Assistant Examiner—David L. Talbott
Attorney, Agent, or Firm—Jacob Frank; Joel Wall; Irving M. Friegsman

[57] ABSTRACT

An optical mirror mount for use in mounting an optical mirror in a generally upright position on a horizontal supporting surface and which is adjustable in pitch and yaw is disclosed. The mount includes a bracket having a horizontal leg and a vertical leg. The horizontal leg is affixed to the supporting surface by a pair of mounting screws, one of the mounting screws extending through a circular mounting hole at one end of the horizontal leg into a threaded hole in the supporting surface and the other mounting screw extending through an elongated mounting slot at the other end of the horizontal leg into another threaded hole in the supporting surface. The vertical leg includes an upper section onto which the optical mirror is attached and a lower section, the upper section being bendable relative to the lower section. A flexure spring block whose tension is controlled by an adjusting screw is attached at one end to the top section of the vertical leg of the bracket and at the other end to the horizontal leg of the bracket. Yaw adjustments are made by loosening the mounting screws holding the bracket on the supporting surface, rotating the bracket about the mounting screw extending into the circular mounting hole in the horizontal leg within the limits set by the size of the mounting slot in the horizontal leg and then tightening the mounting screws when the mount is at the desired position in yaw. Pitch adjustments are made by turning the adjusting screw in the flexure spring until the vertical leg of the bracket is at the desired position in pitch.

9 Claims, 4 Drawing Figures

ADJUSTABLE OPTICAL MIRROR MOUNT

BACKGROUND OF THE INVENTION

The present invention relates generally to optical mirror mounts and more particularly to an optical mirror mount which is adjustable in pitch and yaw.

Optical mirrors are used extensively in optical systems for bending, splitting, focusing or redirecting beams of light. These mirrors are usually attached to some form of mounting device which is anchored to a supporting surface. In many optical systems, such as laser printers, it is essential that the mirrors, if mirrors are being used, be in accurate and precise optical alignment with respect to the impinging beam of light. Quite often, after the mounting device is affixed to the supporting surface some adjustment is necessary either in the pitch direction, the yaw direction or both directions.

In the past, adjustments in the pitch direction have been achieved by inserting one or more shims between the mount and the supporting surface. Some of the disadvantages of this technique are that it very often involves removing the fasteners used to affix the mount to the supporting surface, that it is time consuming, that it is not always very accurate and that it is sometimes very difficult to carry out successfully. In addition, the technique does not enable correcting for misalignment in the yaw direction.

Another approach has been to use ball and socket joint type mounting devices or double gimbel type mounting devices to hold the mirror on the supporting surface. Although these types of mounting devices enable controlled adjustments to be made in both the pitch direction and the yaw direction, they are rather expensive and hence not very practical for many applications.

Thus, the need exists for a mounting device for use in mounting an optical mirror on a supporting surface which is simple in construction, inexpensive to fabricate and adjustable in both the pitch and yaw directions.

Accordingly, it is an object of this invention to provide a new and improved optical mirror mount.

It is another object of this invention to provide an optical mirror mount for use in mounting an optical mirror in a generally upright position on a generally horizontal supporting surface and which is angularly adjustable in pitch and yaw.

It is still another object of this invention to provide an optical mirror mount as described above which contains a minimum number of parts and which is easy and economical to manufacture.

It is yet still another object of this invention to provide an optical mirror mount as desicribed above which does not involve the use of ball and socket type joints or double gimbel type joints.

It is another object of this invention to provide an optical mirror mount which can be easily, quickly and accurately adjusted in pitch and yaw.

It is still another object of this invention to provide an optical mirror mount which can be adjusted in pitch and yaw after it has been attached to a supporting surface.

It is a further object of this invention to provide an optical mirror mount which is especially useful in directing a beam of light from a laser onto a rotating polygon mirror.

It is still a further object of this invention to provide an optical mirror mount which can be adjusted separately in pitch and yaw.

SUMMARY OF THE INVENTION

An optical mirror mount constructed according to the teachings of this invention comprises an L-shaped bracket having a horizonal leg and a vertical leg. The horizontal leg is adapted to be attached to a horizontal supporting surface by a pair of mounting screws, one of the screws extending through a circular mounting hole in the horizontal leg and the other screw extending through an elongated mounting slot in the horizontal leg. The vertical leg includes an upper section onto which the optical mirror to be carried by the mount may be attached and a lower section, the upper section being bendable relative to the lower section. An adjustable flexure spring is attached at one end to the top section of the vertical leg and at the other end to the horizontal leg. Yaw adjustments are made by rotating the bracket about the screw extending through the mounting hole within the limits determined by the size of the mounting slot. Pitch adjustments are made by adjusting the flexure spring to produce the necessary bending of the upper section of the vertical leg relative to the horizontal leg.

The invention is pointed out with particularity in the appended claims. Various features and advantages of the invention will become apparent and understood by referring to the following detailed description of an optical mirror mount constructed in accordance with invention taken in conjunction with the accompanying drawings.

BRIEF DESCRIPTION OF THE DRAWINGS

In the drawings wherein like reference numerals represent like parts.

DETAILED DESCRIPTION OF AN ILLUSTRATIVE EMBODIMENT

Figure 1:
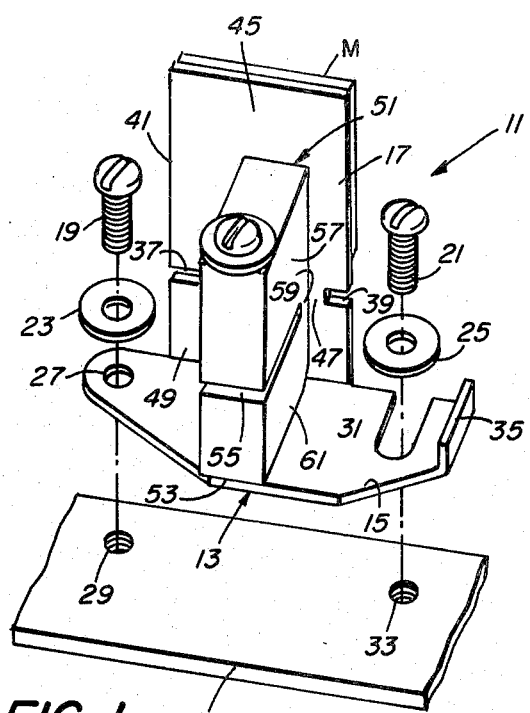
FIG. 1 is a perspective view of an illustrative embodiment of an optical mirror mount constructed according to the teachings of the present invention with a mirror to be used with the mount secured in place.
Figure 2:
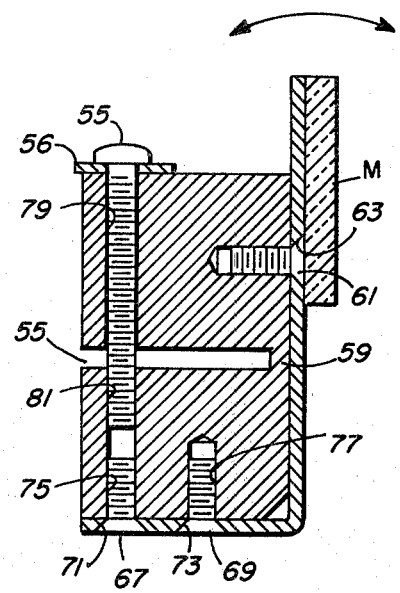
FIG. 2 is a side section view of the optical mirror mount and mirror shown in FIG. 1.
Figure 3:
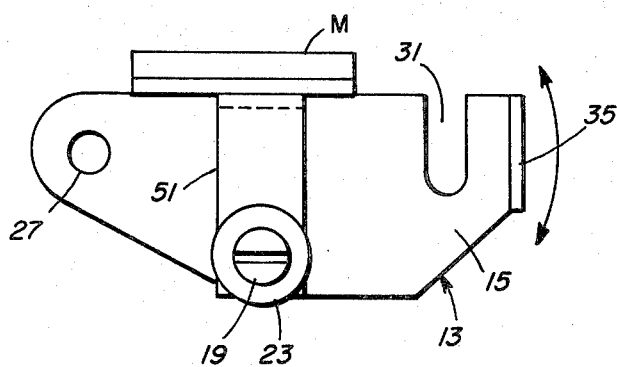
FIG. 3 is a top view of the optical mirror mount and mirror shown in FIG. 1.
Figure 4:
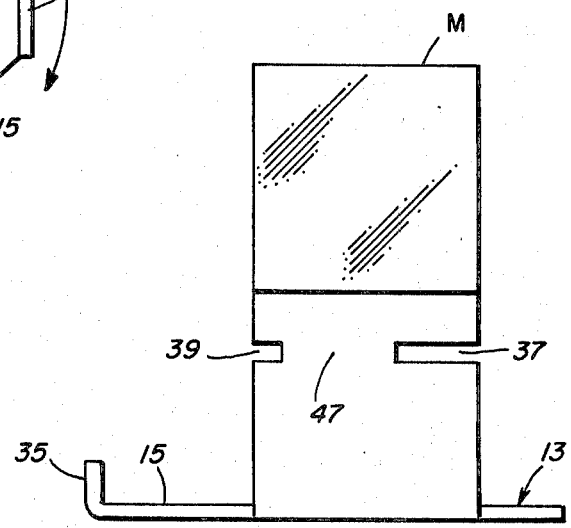
FIG. 4 is a rear elevation view of the optical mirror mount and mirror shown in FIG. 1.

The present invention is directed to an optical mirror mount for use in mounting an optical mirror in an upright position on a horizontal supporting surface and which is adjustable in pitch and yaw. Yaw adjustments are achieved by attaching the mirror mount to a supporting surface in a manner which enables the mirror mount to be rotated within limits about a vertical axis. Pitch adjustments are achieved by providing a mirror mount which can be controllably bent about a horizontal axis.

Referring now to the drawings, there is shown an illustrative embodiment of an optical mirror mount constructed according to the teachings of the present invention and identified generally by reference numeral 11.

Optical mirror mount 11 includes an L-shaped bracket 13 having a generally trapezoidally shaped base or horizontal leg 15 and an integrally formed generally rectangularly shaped upstanding or vertical leg 17, the angle formed by the horizontal leg 15 and the vertical leg 17 being about ninety degrees.

Horizontal leg 15 is adapted to be secured to a horizontal supporting surface S by a pair of screws 19 and 21 and associated washers 23 and 25. Screw 19, which constitutes a yaw pivot screw, extends through a circular mounting hole 27 near one of the base corners of horizontal leg 15 into a suitably positioned threaded hole 29 in supporting surface S. Screw 21, which constitutes a yaw hold down screw, extends through an elongated mounting slot 31 near the other base corner of horizontal leg 15 into a second suitably positioned threaded hole 33 in supporting surface S. The side edge of horizontal leg 15 near mounting slot 31 is bent up to form a finger holding tab 35, as shown.

Vertical leg 17 includes a pair of aligned horizontal slots 37 and 39 extending inward from opposite side edges 41 and 43 and dividing vertical leg 17 into a generally rectangular upper section 45, (i.e. the area above the slots) a generally rectangular intermediate section 47 (i.e. the area between the slots) and a generally rectangular lower section 49 (i.e. the area below the slots). Slots 37 and 39 are sized so that the intermediate section 47 is relatively small and somewhat bendable, enabling thereby the upper section 45 to be bent forward or backward relative to the lower section 49. Upper section 45 is adapted to support a mirror M which may be secured to its rear surface by any suitable means, such as cement or glue (not shown).

Optical mirror mount 11 further includes an adjustable flexure spring block assembly 51 which is used to mechanically bend upper section 45 of bracket 13 backward about its intermediate section 47. Flexure spring block assembly 51 includes a flexure spring block 53 and a pitch adjusting screw 55 and washer 56 combination.

Flexure spring block 53 comprises a rectangular block of material having a horizontal slot or channel 55 extending inward from the front which divides the block into an upper portion 57, an intermediate portion 59 and a lower portion 61. Slot 55 is sized so that upper portion 57 and lower portion 61 can be squeezed inward towards each other by the application of sufficient pressure. Upper portion 57 of block 53 is secured to upper section 45 of vertical leg 17 of bracket 13 by a flat head screw 61 which extends through a countersunk hole 63 in upper section 45 into a threaded hole 65 in upper portion 57. Lower portion 61 of block 53 is secured to horizontal leg 15 of bracket 13 by a pair of flat head screws 67 and 69 which extend upward through countersunk holes 71 and 73, respectively, in horizontal leg 15 into threaded holes 75 and 77, respectively, in lower portion 61 of block 53.

Pitch adjusting screw 55 extends downward through a vertical clearance hole 79 close to the front of upper portion 57 of block 53 into a vertical threaded hole 81 close to the front of lower portion 61 of block 53.

As can be seen, slot 55 in block 53 is in horizontal alignment with slots 37 and 39 in vertical leg 17.

As can be appreciated, as pitch adjustment screw 55 is screwed into lower portion 61 of block 53, the upper portion 57 and the lower portion 61 of block 53 pivot about intermediate portion 59 and are squeezed or drawn in towards each other in much the same manner as a pair of jaws. Since upper portion 57 of block 53 is fixed to upper section 45 of vertical leg 17, the squeezing movement produces a backward bending of upper section 45 of bracket 13. Because of the high spring constant of block 53, there is zero screw backlash as screw 55 is tightened in slot 81.

Bracket 13 may be fabricated from flat stock which may be stamped and bent in a single operation to provide the necessary shape, holes and slots and may be made from aluminum, steel or other similar material. Block 55 may be fabricated by machining from solid stock material or made by a casting and may also be made of aluminum, steel or other similar materials.

In assemblying optical mirror mount 11 and mirror M, block 53 is first attached to bracket 13 with screws 61, 67 and 69. Mirror M is then secured to the back side of top section 45 of vertical leg 17.

In attaching optical mirror mount 11 to supporting surface S, hole 27 and slot 31 in horizontal leg 15 are placed above holes 29 and 33, respectively, in supporting surface S. Screws 19 and 21 are then inserted through hole 27 and slot 31, respectively, and screwed lightly into their respective holes 29 and 33. Bracket 13 is then pivotally turned about screw 19 within the limits of slot 31 until mirror M is at the desired angular position in yaw. Screws 19 and 21 are then tightened. Pitch adjustment screw 55 is then screwed into threaded hole 81 until vertical leg 17 containing mirror M is tilted back to the desired angular position in pitch. If desired, mount 11 may be adjusted in pitch before it is adjusted in yaw. As can be appreciated, the pitch error may be one requiring that the vertical leg be tilted forward rather than backward. In this case, upper portion 57 and lower portion 61 are spread apart a small amount, either by hand or by using some form of wedging tool before screw 55 is tightened.

Although a particular embodiment of the invention has been described and illustrated herein, it is recognized that modifications and variations may readily occur to those skilled in the art and consequently, it is intended that the claims be interpreted to cover such modifications and equivalents.

What is claimed is:

1. An optical mirror mount for use in mounting an optical mirror in an upright position on a horizontal supporting surface and which is adjustable in pitch and yaw comprising an L-shaped bracket having a horizontal leg and a vertical leg, said horizontal leg having a mounting hole and a mounting slot, a first pair of mounting screws for securing said horizontal leg to said supporting surface, one of said screws extending through said mounting hole and the other of said screws extending through said mounting slot, said mounting slot permitting rotational movement of said bracket about a vertical axis extending through said mounting hole so as to allow for adjustment of said bracket in yaw, said vertical leg having an upper section for supporting the optical mirror and a lower section, said upper section being bendably relative to said lower section and adjustable flexure spring means attached to said upper section of said vertical leg and said horizontal leg for bending said upper section of said vertical leg relative to said horizontal leg so as to provide for adjustment of said bracket in pitch.

2. The optical mirror mount of claim 1 and wherein said adjustable flexure spring means comprises a flexure spring block and an adjusting screw for adjusting the tension on said flexure spring block.

3. The optical mirror mount of claim 2 and wherein said flexure spring block includes an upper portion and a lower portion, said upper portion being bendable relative to said lower portion.

4. An optical mirror mount for use in mounting an optical mirror in an upright position on a horizontal supporting surface and which is adjustable in pitch and yaw comprising an L-shaped bracket having a horizontal leg and a vertical leg, said horizontal leg having a mounting hole and a mounting slot, a first pair of mounting screws for securing said horizontal leg to said supporting surface, one of said screws extending through said mounting hole and the other of said screws extending through said mounting slot, said mounting slot permitting rotational movement of said bracket about a vertical axis extending through said mounting hole so as to allow for adjustment of said bracket in yaw, said vertical leg having an upper section, for supporting the optical mirror and a lower section, said upper section being bendable relative to said lower section, and adjustable flexure spring means attached to said upper section of said vertical leg and said horizontal leg for bending said upper section of said vertical leg relative to said horizontal leg so as to provide for adjustment of said bracket in pitch, said adjustable flexure spring means comprising a flexure spring block and an adjusting screw for adjusting the tension on said flexure spring block, said flexure spring block including an upper portion and a lower portion, said upper portion being bendable relative to said lower portion, said upper portion of said flexure spring block being rigidly secured to the upper section of said vertical leg of said bracket and said lower portion of said flexure spring block being rigidly secured to said horizontal leg of said bracket.

5. The optical mirror mount of claim 4 and wherein said bracket is a unitary structure.

6. The optical mirror mount of claim 5 and wherein said flexure spring block comprises a generally rectangular block of material having a lateral slot, said lateral slot separating said block into an upper portion and a lower portion.

7. The optical mirror mount of claim 6 and wherein said vertical leg has a generally rectangular configuration and provided with a pair of aligned lateral slots extending inward from opposite side edges, said slots separating said vertical leg into an upper section and a lower section.

8. The optical mirror mount of claim 7 and wherein said bracket and said flexure spring block are made of aluminum.

9. The optical mirror mount of claim 8 and wherein said upper section of said vertical leg contains a vertical surface adapted to support a mirror.

* * * * *